(12) United States Patent
Need et al.

(10) Patent No.: US 7,607,086 B2
(45) Date of Patent: Oct. 20, 2009

(54) SYSTEM AND METHOD FOR PRE-PROCESSING INPUT EVENTS

(75) Inventors: Dwayne Need, Woodinville, WA (US); Benjamin M. Westbrook, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 351 days.

(21) Appl. No.: 10/715,782

(22) Filed: Nov. 18, 2003

(65) Prior Publication Data

US 2005/0108726 A1    May 19, 2005

(51) Int. Cl.
*G06F 7/00* (2006.01)
(52) U.S. Cl. .................... 715/264; 715/265
(58) Field of Classification Search ............ 715/535, 715/531, 262, 255, 264, 271, 265; 345/172; 707/536
See application file for complete search history.

(56) References Cited

U.S. PATENT DOCUMENTS

| | | | | |
|---|---|---|---|---|
| 5,523,754 A * | 6/1996 | Eisen et al. | ............ | 341/20 |
| 5,778,213 A | 7/1998 | Shakib et al. | ............ | 703/27 |
| 5,812,818 A * | 9/1998 | Adler et al. | ............ | 703/23 |
| 5,828,900 A * | 10/1998 | DeLeeuw et al. | ............ | 710/16 |
| 5,966,719 A | 10/1999 | Okumura | ............ | 715/536 |
| 6,003,050 A | 12/1999 | Silver et al. | ............ | 715/536 |
| 6,141,116 A * | 10/2000 | Odom et al. | ............ | 358/404 |
| 6,259,435 B1 * | 7/2001 | Matthews, Jr. | ............ | 345/172 |
| 6,356,866 B1 | 3/2002 | Pratley et al. | ............ | 704/9 |
| 6,359,572 B1 | 3/2002 | Vale | ............ | 341/23 |
| 6,552,719 B2 | 4/2003 | Lui et al. | ............ | 345/179 |
| 6,562,078 B1 | 5/2003 | Yang et al. | ............ | 715/535 |
| 6,981,217 B1 * | 12/2005 | Knauft et al. | ............ | 715/531 |
| 2003/0154069 A1 * | 8/2003 | Carew et al. | ............ | 704/7 |
| 2004/0117803 A1 * | 6/2004 | Srivastava et al. | ............ | 719/318 |
| 2004/0181776 A1 * | 9/2004 | Atkin et al. | ............ | 717/111 |
| 2004/0268257 A1 * | 12/2004 | Mudusuru | ............ | 715/536 |

* cited by examiner

*Primary Examiner*—Stephen S Hong
*Assistant Examiner*—Manglesh M Patel
(74) *Attorney, Agent, or Firm*—Shook, Hardy & Bacon LLP (57) ABSTRACT

A system and method for the pre-processing of user input events. An input manager configured to interact with text converting components and applications is provided. The input manager receives notification of a user input event, including a code associated with the event. A determination is made whether a text converting component is interested in performing a conversion action with respect to the input event. When a text conversion component is interested in performing a conversion action, the code is obfuscated from the applications. The code may also be obfuscated from the applications when a computer component, such as an input method editor, is interested in processing the input event.

30 Claims, 7 Drawing Sheets

SYSTEM AND METHOD FOR PRE-PROCESSING INPUT EVENTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to the field of computer software. More particularly, the present invention relates to a system and method for pre-processing input events.

BACKGROUND OF THE INVENTION

With continued globalization and growth of computer use around the world, the need for computer platforms which are able to accommodate multiple cultures and languages has greatly increased. In today's interconnected world, computer software programs often have the ability to provide user interfaces in multiple languages, allowing a single software product to be utilized by computer users across the globe. Such interfaces have the ability to accept inputs from a variety of input sources and output the language that a user requires.

To facilitate a multiple language computing environment, computer platforms often utilize an input method editor (IME), a program that allows users to enter a variety of languages using a standard keyboard. IMEs are commonly used to create complex characters and symbols, such as Japanese Kanji characters. For example, Microsoft Corporation's WINDOWS® 2000™ operating system includes systems IMEs for locales with languages using non-Latin alphabets, such as Japanese, Koreans, and Chinese. IMEs may be quite sophisticated and often use multiple keyboard commands to define individual composed characters. When an IME is active, input events such as a keyboard keystroke may be routed through the IME to allow the IME to process the input event and output a desired character.

A text converter also may handle input events. For example, such a text converter may output a Unicode value. Unicode is an international standard for international coding text. Unicode provides the capacity to encode all the characters used for the major written languages of the world. For example, Unicode scripts include Latin, Greek, Armenian, Hebrew, Arabic, Bengali, Thai, Japanese kana, a unified set of Chinese, Japanese, and Korean ideographs, as well as many other languages. Unicode is based on a 16-bit code set that provides codes for more than 65,000 characters, whereby each character is identified by a unique 16-bit value. By utilizing such a text converter, a computer system providing a multiple language computing environment may convert a user input event into a value that represents any number of multi-language characters.

A problem occasionally experienced when a computing platform utilizes an IME and/or a text converter is determining whether an IME, a text converter, or an application should handle a given input event. For example, an application designed for the English language may be running on a computer system that has an enabled Spanish language IME. If the application, when written, did not contemplate operation with multiple languages or with an IME, the application may attempt to handle input events as if the IME was not enabled. The application will attempt to interpret the Spanish user inputs. However, because the application did not contemplate non-English inputs, the communication will fail, and the application will not be useful to a user. Often software developers are not aware of multi-language features included with particular platforms, and the applications created by such developers do not perform well when multi-language utilities are in operation. Accordingly, there is a need for improved techniques that allow applications to co-exist with input processing utilities such as IMEs and text converters.

SUMMARY OF THE INVENTION

The present invention meets the above needs and overcomes one or more deficiencies in the prior art by providing a system and method for pre-processing input events. In one aspect of the present invention, a computer-implemented method is provided for processing a user input event. A code is associated with the event, and notification of the event, including the associated code, is received. The method determines whether a text converting component is interested in performing a conversion action with respect to the input event. When the text conversion component is interested in performing a conversion action, the code is obfuscated from an application.

Another aspect of the present invention includes a computer system for processing a user input event, the event having a code associated therewith. The system includes one or more text converting components, one or more applications, and an input manager. The input manager is configured to receive notification of the input event and, when a text converting component is interested in performing a conversion action, to obfuscate the associated code from the applications.

A further aspect of the present invention includes an input manager. The input manager includes a user input component for obtaining data indicating a user input event including a code associated with the event. The input manager further includes a text converter interface for determining whether one or more text converting components are interested in performing a conversion action with respect to the input event. An application interface component is also included. This component obfuscates the code from an application when one or more of the text converting components are interested in performing a conversion action with respect to the input event.

BRIEF DESCRIPTION OF THE SEVERAL DRAWINGS

The present invention is described in detail below with reference to the attached drawing figures, wherein.

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The present invention provides an improved system and method for the pre-processing of user input events. An exemplary operating environment for the present invention is described below.

Figure 1:
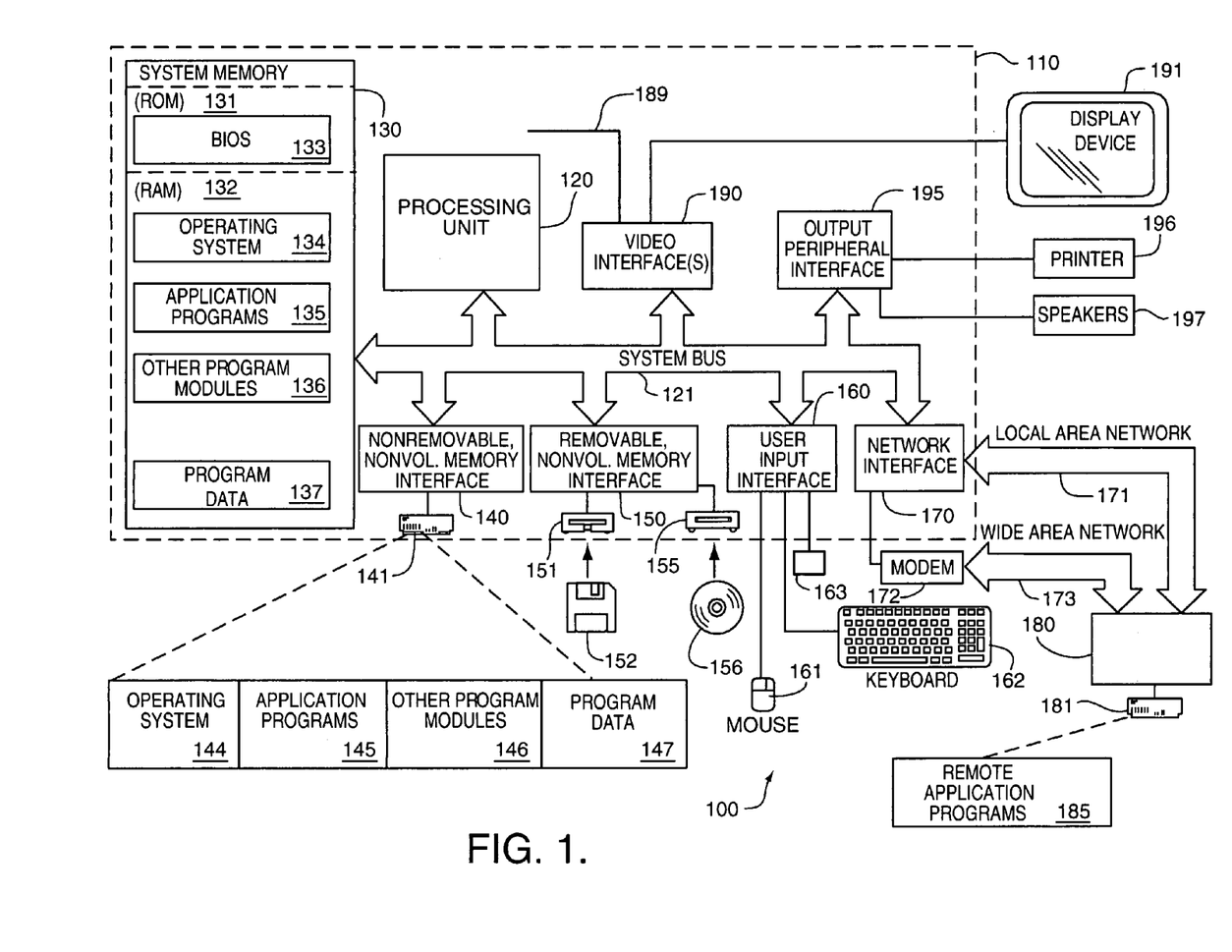
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2A:
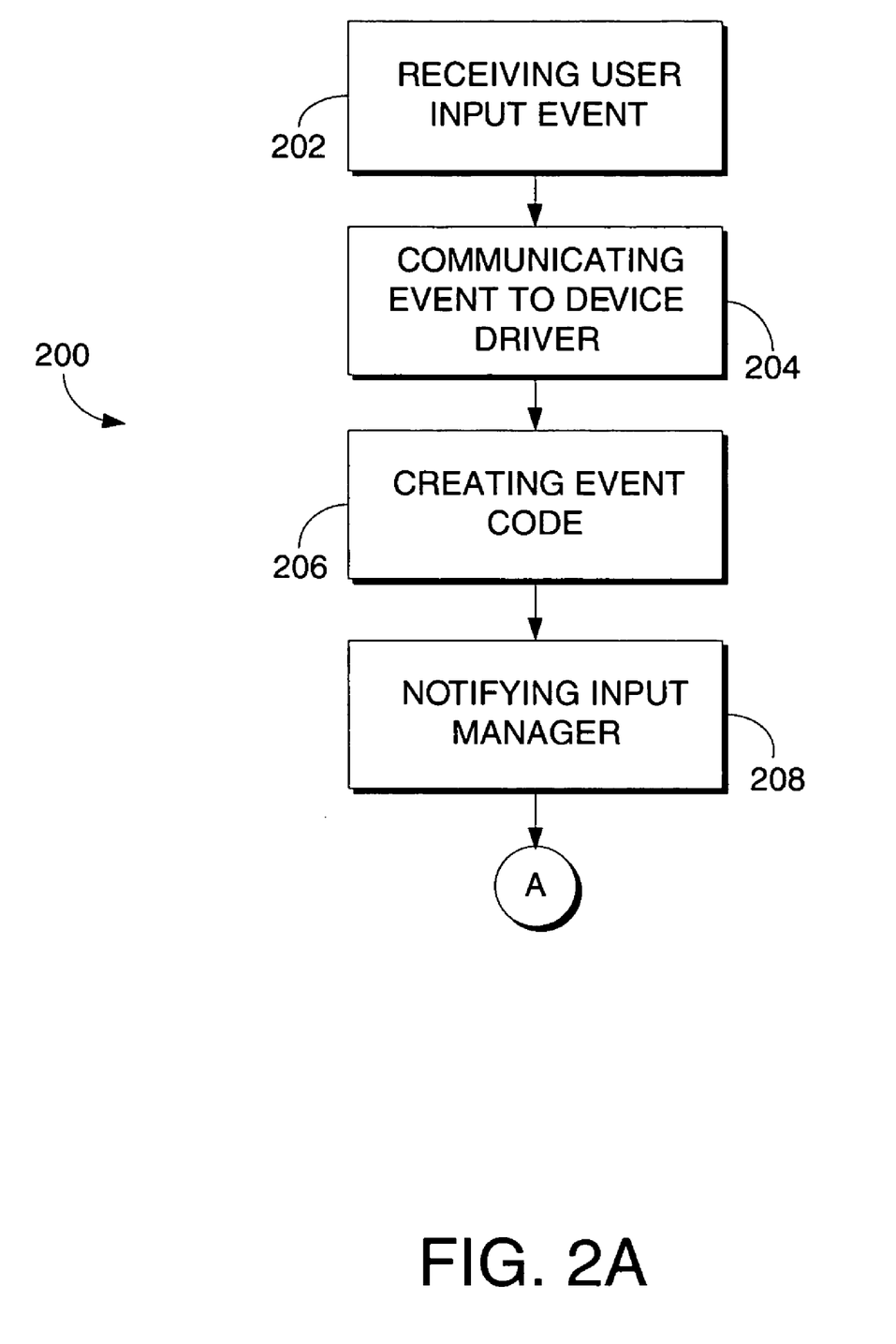
FIGS. 2A-2C are a flow diagram showing a method for processing a user input event in accordance with an embodiment of the present invention.
Figure 2B:
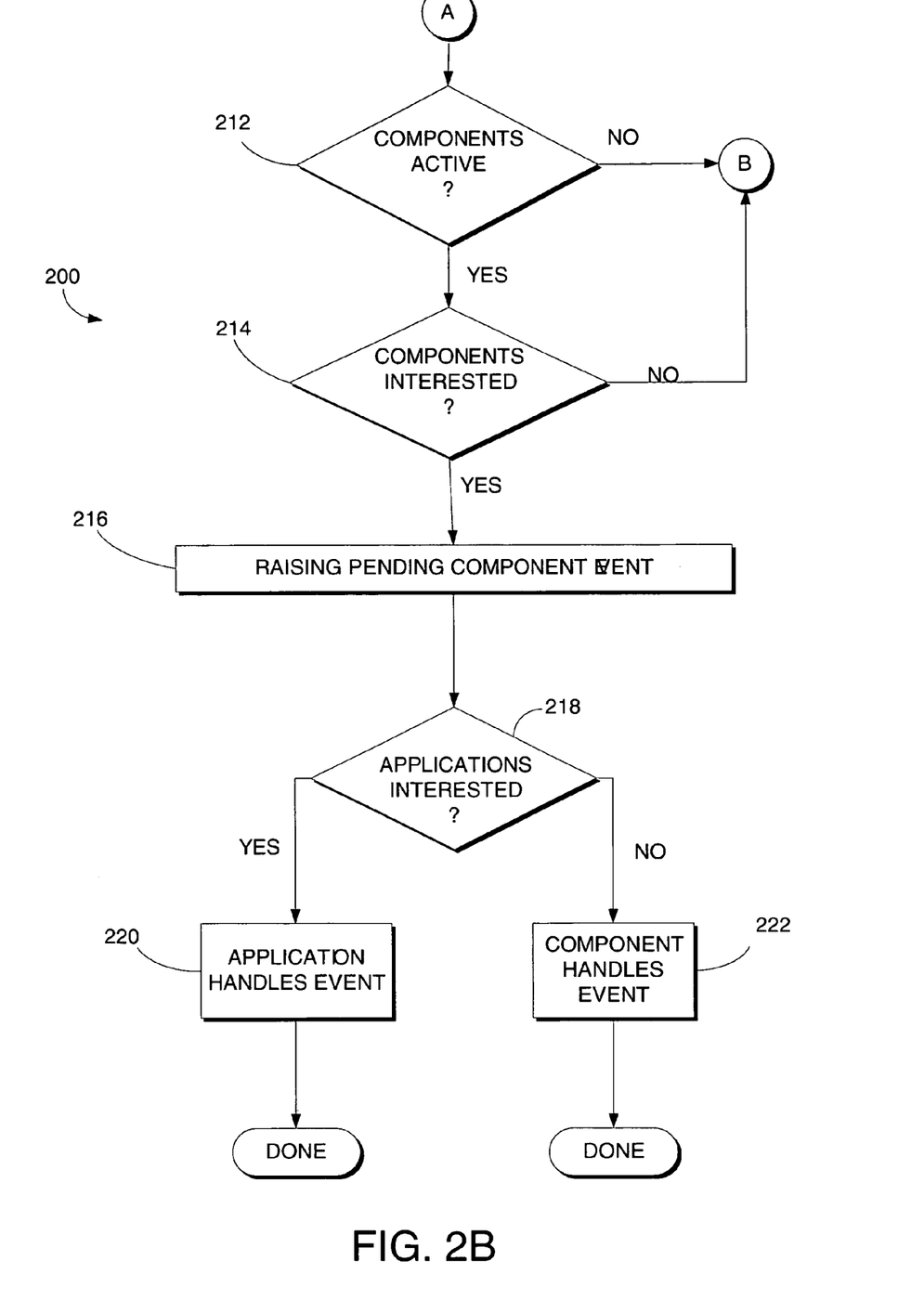
Figure 2C:
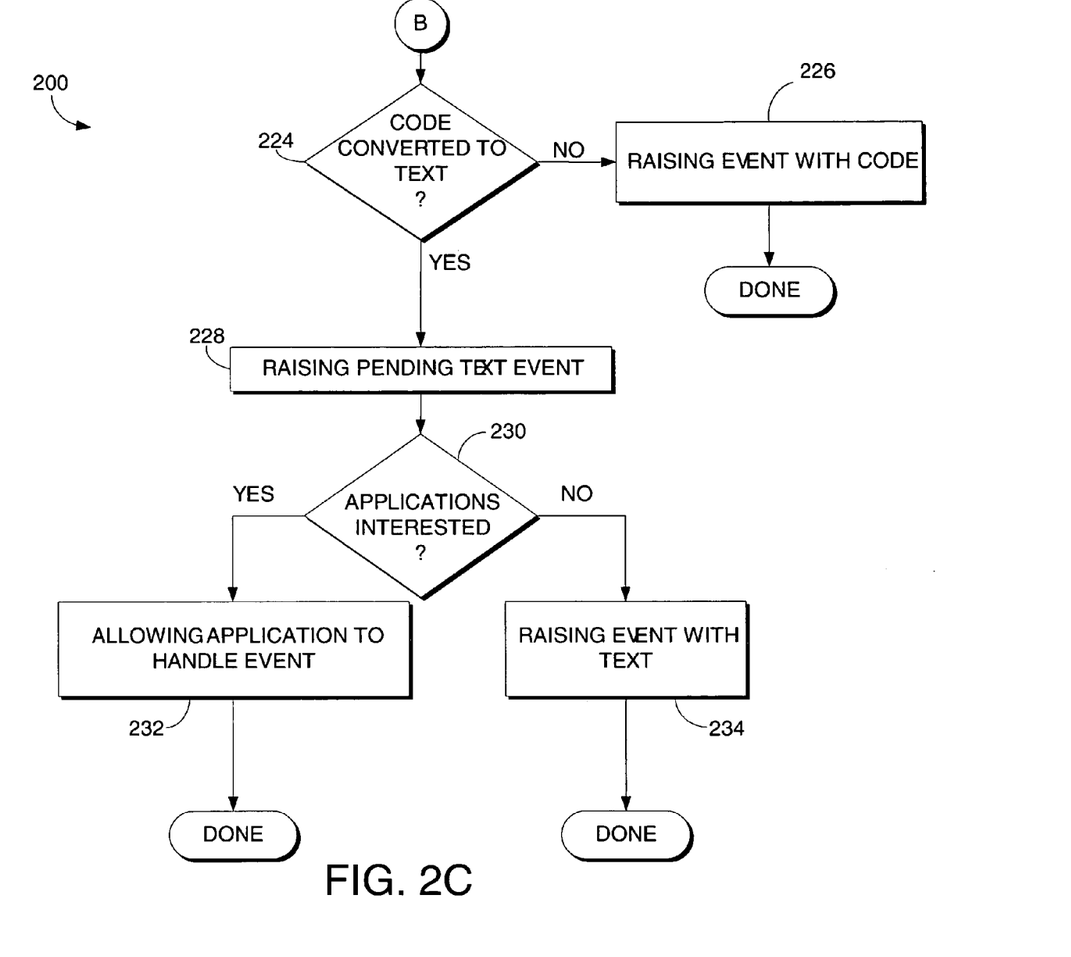

FIGS. 2A-2C display a flow diagram showing a method 200 for processing a user input event in accordance with an embodiment of the present invention. In FIG. 2A, at 202, a user input event is received. The input event may be received by a variety of input devices including, without limitation, a keyboard, a screen with user input capability, a mouse, and/or a device with voice input capacity. Those skilled in the art will recognize that any number of input devices are acceptable for receiving the user input.

The present invention contemplates inputs that are related to elements of written language/communication such as words, letters, characters, ideographs, or symbols. Furthermore, the inputs may be related to a desired language. For example, if the desired language is French, the inputs may relate to letters in the French language, and, if the desired language is Chinese, the inputs may relate to Japanese Kanji characters. According to one embodiment of the present invention, the utilized input device need not originally have been configured according a desired language. For example, a standard English language keyboard may be utilized to input a variety of languages.

At 204, the method 200 notifies a device driver associated with the input device of the input event. As will be recognized by those skilled in the art, input devices generally have driver code modules that interrupt hardware events and provide information about the events to other software modules. For example, when an "N" key is pressed on a keyboard, the keyboard registers the event and communicates the event to the keyboard driver. Such communication may be via a port interface operably coupled to the keyboard device and to the driver. The keyboard driver is able to interpret the keyboard event and determine that an "N" was input.

After being notified of an input event, at 206 the driver creates a code associated with the input event. This code may be used by software modules to identify the input event. Depending upon the driver, the code may identify elements such as letters, characters, ideographs, or symbols. For example, upon receiving an indication that the "N" key was pressed, the driver may output a code value identifying an input of the letter "N." Applications may receive this code and become aware of the "N" input. As will be appreciated by those skilled in the art, any number of indicia that identify a hardware event may be considered a code in accordance to the present invention.

At 208, notification of the input event and the associated code is passed to an input manager. The input manager is utilized to facilitate determining which system element should process the input event. As those skilled in the art will recognize, an input manager according to the present invention may perform a variety of input routing and pre-processing operations with respect to a given input. For example, an input manager may interface with a variety of applications, an operating system and/or multi-language utilities to route an input event.

In FIG. 2B at 212, the method 200 determines whether any computer components capable of processing the input event are active. Step 212 is an optional step, and the present invention contemplates foregoing this determination. When step 212 is not performed the method 200 proceeds as if no components are active.

A wide variety of computer components capable of processing input event are acceptable for use with the present invention. The method 200 allows the input manager to give priority to these computer components in that the components are given an opportunity to express an interest in processing an input before applications. An example of a computer component which may command such priority is an input method editor (IME). IMEs are well known in the art and allow users to enter a variety of letters, symbols, ideographs and/or characters using a standard keyboard. For example, IMEs may allow complex characters including Japanese, Chinese or Korean text to be input using a standard keyboard.

If one or more computer components are active, at 214, the method determines whether any of the active components are interested in handling the input event. As will be understood by those skilled in the art, a computer component may be interested in handling an input event if the computer component is configured to process the input associated with the event. Such input processing may vary greatly between computer components.

If a computer component is interested in processing the input event, at 216, one or more active applications are notified of the user input event. One or more applications may be actively expecting notification of user inputs from the input manager. When an active computer component indicates a desire to handle the input, these applications may be made aware of the input event but are not made aware of the code identifying the input. Instead, an event is raised which notifies the applications that a computer component action is pending with respect to the input. In one embodiment of the present invention, such notification is made by replacing the code value with a sentinel value indicating a pending computer component action. For example, if an "N" is input and an computer component is interested in processing the "N," the active applications are made aware that an input was received and that a computer component event is pending.

At 218, the method 200 determines whether an application is interested in handling the input event. If an application is interested in handling the input event, at 220, the input manager allows such handling, and the application is passed the sentinel value indicating a pending computer component action. The application must perform further actions to determine the actual code value associated with the input event. If the one or more applications are not interested in handling the input event, at 222 the interested computer component is allowed to handle the event, and the input manager takes no further action with respect to the input event.

Turning in FIG. 2C, when no computer components are active or interested in processing the input event, at 224, the method 200 determines whether the code is capable of being converted to text. As will be understood by those skilled in the art, a text converter component may be configured to receive the code value and to output a value indicating a character of text. For example, the text converter component may output Unicode values. Unicode is a standard for international coding text that provides the capacity to encode the characters of the major written languages of the world. For example, if a text converter component receives a code value associated with an "N" input and the text converter component is configured for English, the text converter may output the Unicode value identifying the letter "N." However, if the text converter component is configured for the Spanish language, the output may be the Unicode value identifying the Spanish letter eñe. Those skilled in the art will recognize that a variety of text mappings may by used to convert the code to a text identifier and that a text converter component may be configured to generate multiple characters from a single input.

When no text converter component is capable of converting the code into text, at 226, an event is raised with the code value. By raising such an event, the code value may be utilized by applications and other system elements interested in input events. For example, the code value may correspond to the F1 keyboard key. If no text conversion is associated with this keystroke, the raised event will allow applications to become aware of the F1 input.

When the code may be converted by a text converter component, the input manager raises an event at 228, and one or more applications are notified of the user input event. However, the code associated with the input event is obfuscated from the applications. Instead, the applications receive notification only that a text conversion action is pending with respect to the input. In one embodiment of the present invention, such notification is made by the replacing the code value with a sentinel value indicating a pending text event. For example, if an "N" is input and a text converter component is interested in processing the "N," the active applications are made aware only that an input was received and that a conversion event is pending.

If an application is interested in handling the input event, at 232, the input manager allows such handling and passes the sentinel value indicating a pending text event. The application must perform further actions to determine the actual code value associated with the input event. If the one or more applications are not interested in handling the input event, at 234, a conversion action is performed with respect to the code value and an event is raised with the output text value. Such an event allows applications and/or system elements to utilize text associated with the input event.

Figure 3:
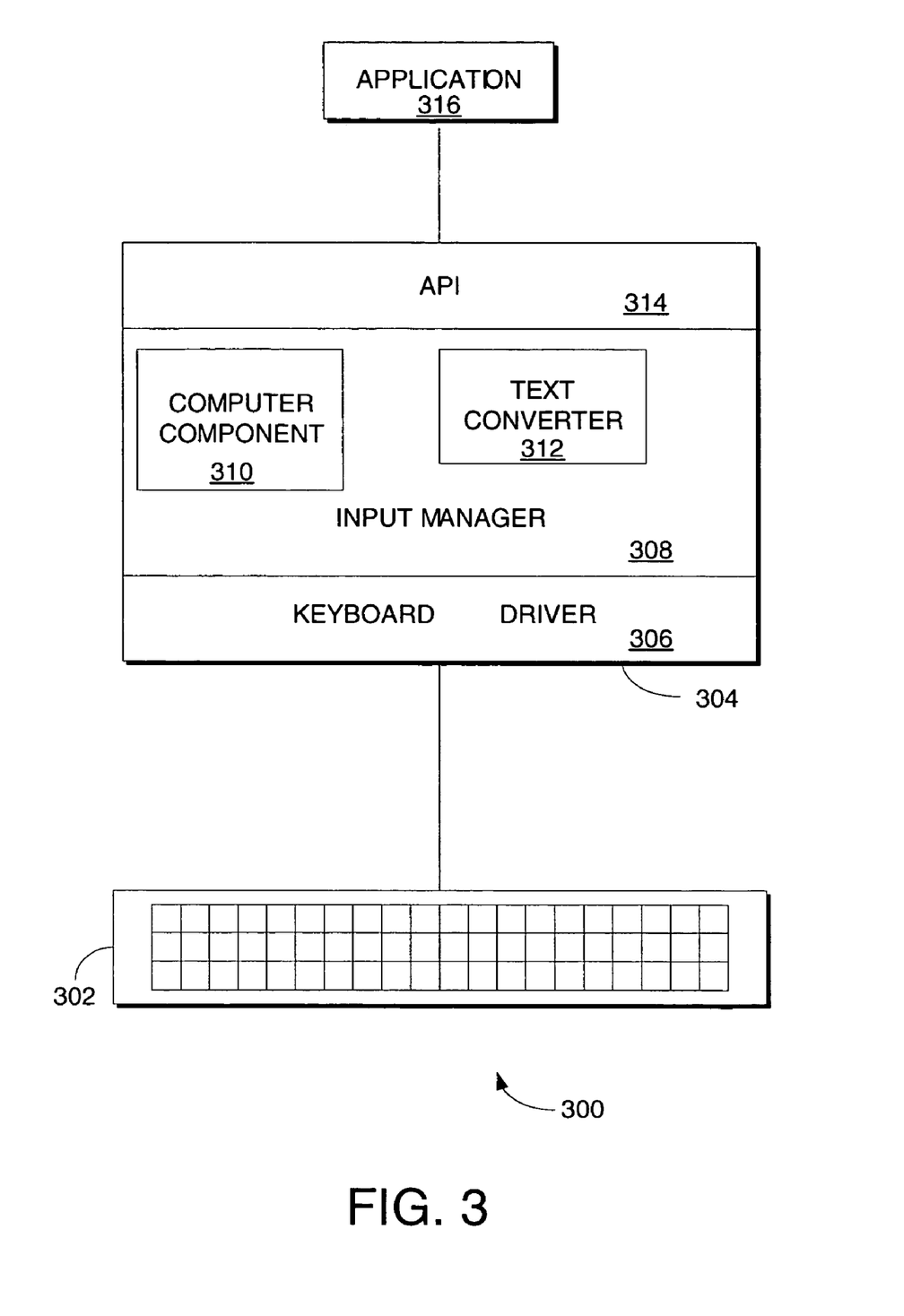
FIG. 3 is a block diagram of a system for processing inputs according to the present invention.

FIG. 3 shows a system 300 for processing input events according to the present invention. A keyboard 302 receives inputs from a user. Those skilled in the art will recognize that such inputs may be communicated by a variety of input devices including, without limitation, a keyboard, a screen with user input capability, a mouse, and/or a device with voice input capacity. The present invention contemplates inputs that are related to elements of a desired language such as words, letters, characters, ideographs, or symbols. According to one embodiment of the present invention, the utilized input device need not have been originally configured to accept inputs according to the desired language. For example, a standard English language keyboard may be utilized to input a variety of languages.

The keyboard 302 is in communication with a keyboard driver 306. The keyboard driver 306 may be contained within an operating system 304. As will be recognized by those skilled in the art, when a key is pressed on the keyboard 306, the keyboard 306 registers the input and communicates the event to the keyboard driver 306. After receiving a keystroke event, the driver 306 creates a code associated with the event. This code may be used by software modules to identify the input event. For example, upon receiving indication that the "N" key was pressed, the keyboard driver 306 may output a code value identifying an input of the letter "N." As will be appreciated by those skilled in the art, any number of indicia that identify a hardware event may be considered a code in accordance with the present invention.

Following an input event, the keyboard driver 306 interfaces with input manager 308 and notifies the input manager 308 of the keystroke. Such notification includes the code associated with the input. As those skilled in the art will recognize, an input manager according to the present invention may perform a variety of input routing and pre-processing operations with respect to a given input. As shown in FIG. 3, the input manager 308 is in communication with keyboard driver 306, computer component 310, text converting component 312, and application program interface (API) 314. As will be understood by those skilled in the art, the computer component 310 may be a component capable of processing input events such as an IME, while the text converting component 312 may be configured to output a value indicating a character of text. For example, the text converter component 312 may output Unicode values.

The input manager 308 may facilitate a determination of which system element should process the input event. For example, the input manager 308 may be configured to perform the method for processing input shown in FIGS. 2A-2C.

When the computer component 310 and/or the text converting component 312 indicate a desire to handle the input, the application 316 is made aware of the input event. The input editor 308 makes this communication via interface 314. Application 316, however, is not made aware of the code identifying the input. Instead, the application 316 receives notification that an action is pending with respect to the input. In one embodiment of the present invention, such notification is made by replacing the code value with a sentinel value indicating a pending computer component or conversion action. If the application 316 is interested in handling the input event, the input manager 308 allows such handling and the application is passed the sentinel value.

Figure 4:
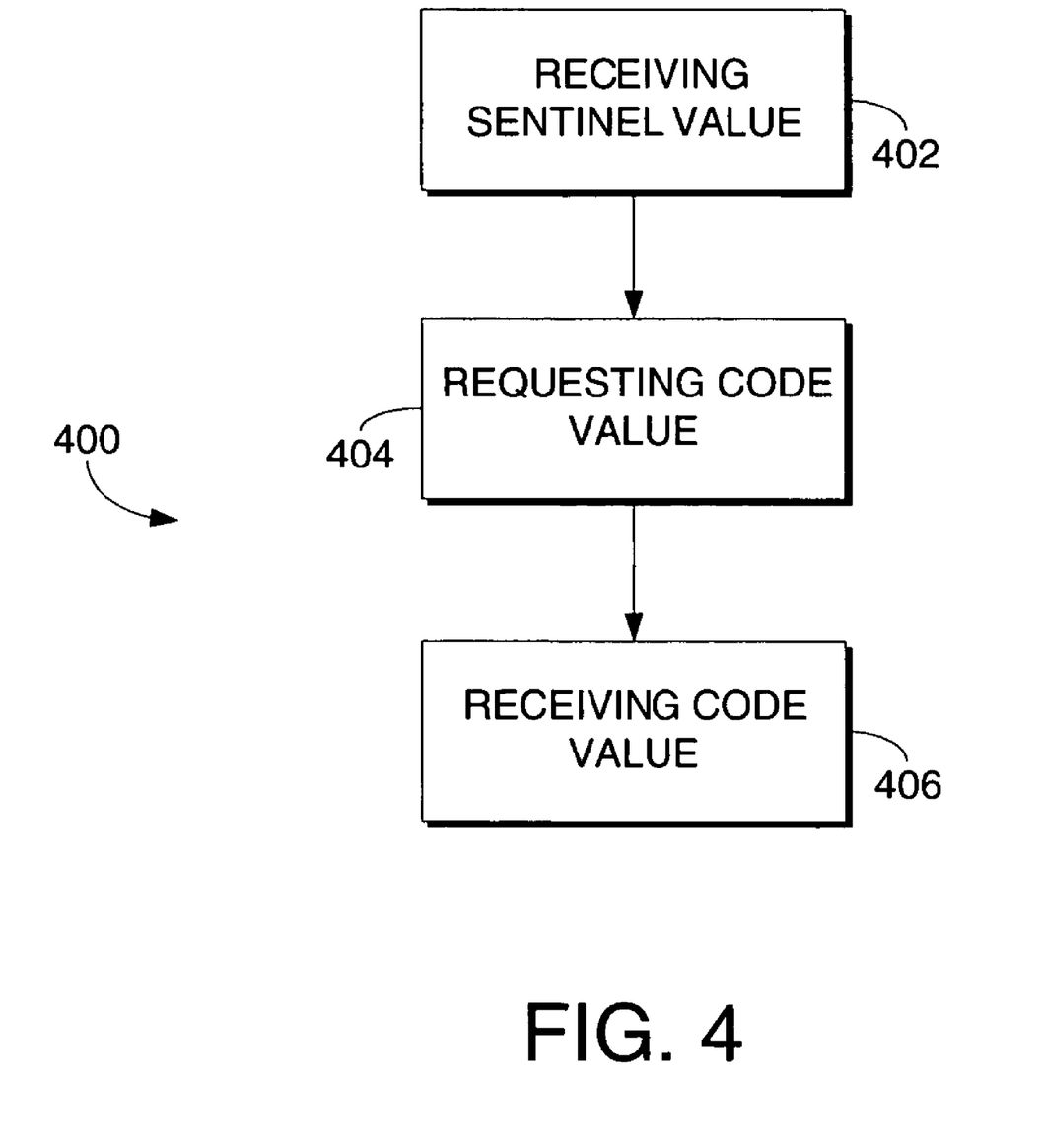
FIG. 4 is a flow diagram showing a method for revealing input values according to the present invention.

To determine the code value that has been obfuscated by the sentinel value, application 316 may interact further with the input manager 308. FIG. 4 displays an exemplary method 400 for such interaction. At 402, an application receives a sentinel value associated with an input event. As discussed above the sentinel value may indicate that a computer component event is pending or that a text conversion event is pending, but the sentinel value obfuscates the underlying code. For example, if the input event is a keystroke, the application will be made aware that an input was made but will not be passed a code identifying which key was struck. While sentinel values protect the code when events are pending, there may be situations when such protection is not warranted and overrides may be incorporated into the present invention to allow applications to learn the code value.

At 404, the application requests the code value from the input manager, which is returned to the application at 406. Those skilled in the art will recognize that any number of overrides may be acceptable for use by the present invention. In one embodiment, the input manager makes available an alternate set of function calls to which an application may reference after notification of a pending computer component or text processing event. The value returned by these functions will be the non-obfuscated code associated with an input event.

Figure 5:
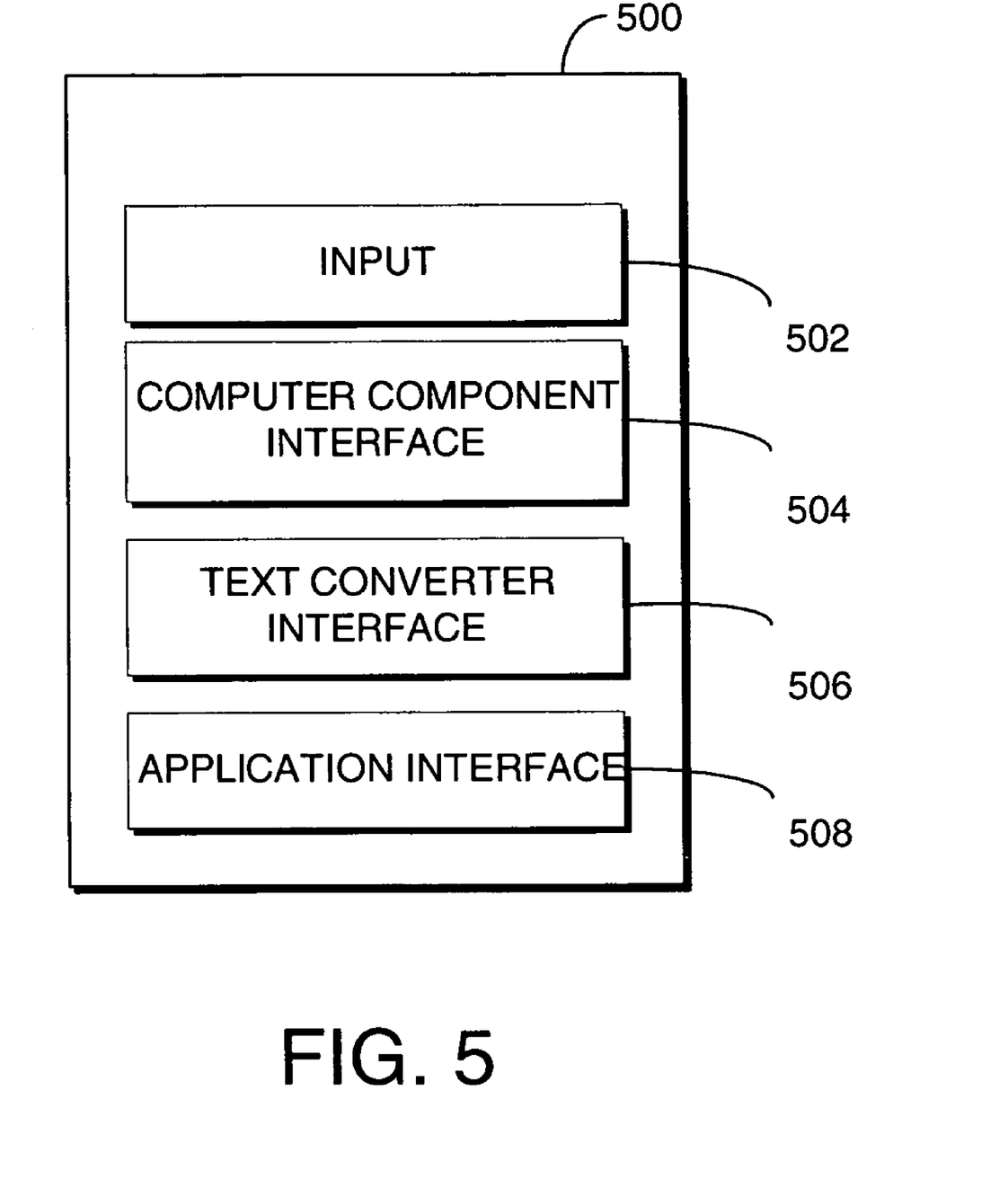
FIG. 5 is a block diagram of an input manager in accordance with an embodiment of the present invention.

FIG. 5 shows an input manager 500 in accordance with the present invention. As described above, the input manager 500 may facilitate a determination of which system element should process an input event and may route input events to the proper system elements.

Input manger 500 includes a user input component for obtaining data indicating a user input event. This data may be received from a device driver associated with an input device and the data may include a code associated with the input event. The code may identify content associated with an input event, such as a symbol, character or letter.

Input manager 500 also includes a computer component interface 504. This component communicates with computer components to determine whether a computer component is interested in handling the user input event. The input manager 500 further includes a text converter interface 506 which may be utilized for determining whether one or more text converters are interested in performing a conversion action with respect to the input event.

When either a computer component or a text converter indicates an interest in handling a user input event, the input editor 500 notifies one or more applications of the input event. The input editor 500 makes this communication via application interface 508. The notified application, however, is not made aware of the code identifying the input. Instead, the applications receive notification that a computer component or conversion action is pending with respect to the input. As described above, such notification is made by replacing the code value with a sentinel value indicating a pending computer component or conversation action.

The present invention provides an improved system and method for the pre-processing of user input events. In one embodiment, an input manager interacts with system elements and routes the processing of a user input event. The input manager receives notification of a user input event, including a code associated with the event. A determination is made whether a system element, such as a text converting component or an input method editor, is interested in processing an input event. When a system element is interested in processing an input event, the code is obfuscated from interested applications.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computerized method for processing a user input event having a code associated therewith, said method comprising:
receiving notification of said input event, said notification including the associated code;
determining whether a text converting component is interested in performing a conversion action with respect to said input event;
notifying an application of said input event, by providing said application a sentinel value indicating a pending text event, when the text converting component is interested in performing said conversion action with respect to said input event;
receiving from the application a specific request associated with said sentinel value to disclose said code, wherein said request is generated by the application incident to the application recognizing that said sentinel value represents a type of input event that is capable of being processed by said application; and
revealing said code to the application in response to said request to disclose said code.

2. The computerized method of claim 1, wherein said user input event is communicated via a keyboard, a screen with user input capability, a mouse, and/or a device with voice input capacity.

3. The computerized method of claim 1, wherein said code identifies at least a portion of a letter, a character, an ideograph or a symbol associated with said user input event.

4. The computerized method of claim 1, further comprising communicating said code to the application when the text converting component is not interested in processing said user input event.

5. The computerized method of claim 1, wherein the text converting component is configured to convert said code to a standard for coding text.

6. The computerized method of claim 5, wherein said standard is Unicode.

7. The computerized method of claim 1, further comprising determining whether a computer component is interested in processing said input event.

8. The computerized method of claim 7, further comprising obfuscating said code from an application when the computer component is interested in processing said input event.

9. The computerized method of claim 8, further comprising notifying the application that the computer component is interested in processing said input event.

10. The computerized method of claim 7, wherein said computer component is an input method editor.

11. The computerized method of claim 7, wherein said computer component is configured to allow a user to enter at least a portion of a letter, a character, an ideograph or a symbol associated with a desired language.

12. A computer system for processing a user input event having a code associated therewith, the system comprising:
one or more text converting components;
one or more applications; and
an input manager configured to interact with said one or more text convening components and said one or more applications, wherein said input manager is configured to receive notification of an input event, said notification including the associated code, and wherein said input manager is further configured to prevent said one or more applications from handling said input event by providing a sentinel value indicating a pending text event to the one or more applications when said one or more text converting components are interested in performing a conversion action with respect to said input event, wherein said input manager is further configured to receive from an application a specific request associated with said sentinel value to disclose said code, wherein said request is generated by the application incident to the application recognizing that said sentinel value represents a type of input event that is capable of being processed by said application, wherein said input manager is further configured to reveal said code to said application in response to said request to disclose said code.

13. The computer system of claim 12, wherein said code is generated by a driver associated with an input device.

14. The computer system of claim 12, wherein said code identifies at least a portion of a letter, a character, an ideograph, or a symbol associated with said user input event.

15. The computer system of claim 12, wherein said user input event is communicated via an input device that is not configured according to a desired language.

16. The computer system of claim 12, wherein said input manager is further configured to communicate said code to one or more applications when none of the text converters are interested in processing said user input event.

17. The computer system of claim 12, wherein at least one of said text converters is configured to convert said code to a standard for coding text.

18. The computer system of claim 17, wherein said standard is Unicode.

19. The computer system of claim 12, wherein said input manager is further configured to notify the one or more applications that at least one of said text converting components is interested in performing a conversion action with respect to said input event.

20. The computer system of claim 12, further comprising one or more computer components.

21. The computer system of claim 20, wherein at least one of said computer components is an input method editor.

22. The computer system of claim 20, wherein said input manager is configured to obfuscate said code from the one or more applications when one or more of said computer components are interested in handling said input event.

23. An input manager embodied on one or more computer-readable media and executable on a computer, said input manager comprising:
a user input component for obtaining data indicating a user input event having a code associated therewith, said data including the associated code;
a text converter interface component for determining whether one or more text converting components are interested in performing a conversion action with respect to said input event; and
an application interface component which prevents an application from handling said user input event by providing a sentinel value indicating a pending text event to said application when one or more of said text converting components are interested in performing a conversion action with respect to said input event, wherein said application interface component is further configured to receive from the application a specific request associated with said sentinel value to disclose said code, wherein said request is generated by the application incident to the application recognizing that said sentinel value represents a type of input event that is capable of being processed by said application, wherein said application interface component is further configured to reveal said code to said application in response to said request to disclose said code.

24. The input manager of claim 23, wherein said code identifies at least a portion of a letter, a character, an ideograph, or a symbol associated with said user input event.

25. The input manager of claim 23, further comprising a computer component interface component for determining whether one or more computer components are interested in handling said user input event.

26. The input manager of claim 25, wherein said application interface component obfuscates said code from the application when one or more of said computer components are interested in handling said input event.

27. The input manager of claim 25, wherein one or more of said computer components are input method editors.

28. A computer system for processing a user input event having a code associated therewith, the system comprising:
means for receiving notification of a user input event having a code associated therewith, said notification including the associated code;
means for convening said code to a value indicating a character or a symbol;
one or more applications; and
means for interacting with said one or more applications and said convening means in response to notification of said user input event, wherein said means for interacting are configured to prevent said one or more applications from handling said user input event by providing a sentinel value indicating a pending text event to the one or more applications when said converting means are interested in performing a conversion action with respect to said input event, wherein said means for interacting is further configured to receive from an application a specific request associated with said sentinel value to disclose said code, wherein said request is generated by the application incident to the application recognizing that said sentinel value represents a type of input event that is capable of being processed by said application, wherein said means for interacting is further configured to reveal said code to said application in response to said request to disclose said code.

29. The computer system of claim 28, further comprising means for editing an input method.

30. The computer system of claim 29, wherein said means for interacting are further configured to obfuscate said code from the one or more applications when said editing means are interested in handling said input event.

* * * * *